(12) United States Patent
Usui

(10) Patent No.: US 7,306,233 B2
(45) Date of Patent: Dec. 11, 2007

(54) COMBINED OIL CONTROL RING

(75) Inventor: Miyuki Usui, Kashiwazaki (JP)

(73) Assignee: Kabushiki Kaisha Riken, Tokyo (JP)

( * ) Notice: Subject to any disclaimer, the term of this patent is extended or adjusted under 35 U.S.C. 154(b) by 0 days.

(21) Appl. No.: 10/536,559

(22) PCT Filed: Feb. 19, 2004

(86) PCT No.: PCT/JP2004/001853

§ 371 (c)(1),
(2), (4) Date: May 27, 2005

(87) PCT Pub. No.: WO2004/074717

PCT Pub. Date: Sep. 2, 2004

(65) Prior Publication Data

US 2006/0027976 A1 Feb. 9, 2006

(30) Foreign Application Priority Data

Feb. 20, 2003 (JP) ............................. 2003-042515

(51) Int. Cl.
*F16J 9/12* (2006.01)
(52) U.S. Cl. .................. 277/460; 277/465; 277/472
(58) Field of Classification Search ................ 277/460, 277/465, 472
See application file for complete search history.

(56) References Cited

U.S. PATENT DOCUMENTS 2,087,208 A * 7/1937 Frielingsdorf ................ 277/469
2,445,090 A * 7/1948 Thompson ................ 277/463
5,265,890 A * 11/1993 Balsells ................ 277/467

FOREIGN PATENT DOCUMENTS

| FR | 1474049 | 3/1967 |
|---|---|---|
| FR | 2183443 | 12/1973 |
| GB | 1084389 | 9/1967 |
| GB | 1125031 | 8/1968 |
| JP | 45-10482 | 5/1970 |
| JP | 60-69350 U | 5/1985 |
| JP | 61-45172 A | 3/1986 |
| JP | 3-38456 U | 4/1991 |
| JP | 8-200500 A | 8/1996 |
| JP | 9-42450 A | 2/1997 |
| JP | 9-144881 A | 6/1997 |
| JP | 2003-287128 A | 10/2003 |

* cited by examiner

*Primary Examiner*—Vishal Patel
(74) *Attorney, Agent, or Firm*—Kubovcik & Kubovcik

(57) ABSTRACT

In mounting a combined oil control ring in a ring groove formed in a piston, the combined oil control ring is mounted in a form that an opening between but ends of an oil ring body is widened. In such an operation, it is likely that a coil expander falls off the oil ring body thus making the mounting operation cumbersome. To overcome such a drawback, a relationship $L1<L2$ is established. Here $L1$ means a axial distance between open peripheries of the groove portion and $L2$ means a maximum axial distance between peripheries of the groove portion.

7 Claims, 5 Drawing Sheets

Prior Art

COMBINED OIL CONTROL RING

This application is a 371 of international application PCT/JP2004/001853, which claims priority based on Japanese patent application No. 2003-42515 filed Feb. 20, 2003, which is incorporated herein by reference.

BACKGROUND OF THE INVENTION

1. Field of the Invention

The present invention relates to a combined oil control ring which is mounted on a piston of an internal combustion engine.

2. Description of the Related Art

A combined oil control ring having an approximately M-shaped cross section, which is configured such that upper and lower rails which bring outer peripheral surfaces thereof into slide contact with an inner surface of a cylinder and a web which connects the upper and lower rails and has a plurality of windows are integrally formed, is described in Japanese Unexamined Patent Publication Sho 61(1986)-45172 and Japanese Unexamined Patent Publication Hei 9(1997)-144881, for example.

As shown in FIG. 4, the combined oil control ring consists of an oil ring body 1 and a coil expander 2. The oil ring body 1 is an oil ring having an approximately M-shaped cross section in the radial direction which is formed of upper and lower rails 3, 4 and a web 5 which connects these rails 3, 4. Such a combined oil control ring is mounted in an oil ring groove 21 formed in a piston 20.

Outer-peripheral protruding portions 6, 7 of the respective upper and lower rails 3, 4 have an approximately trapezoidal shape which is formed of outerperipheral slide surfaces 8, 9 which are brought into contact with a cylinder wall 22 and upper and lower inclined surfaces 10, 11 which are contiguous with the outer peripheral slide surfaces 8, 9. Side surfaces 12, 13 of the respective upper and lower rails 3, 4 face respective upper and lower surfaces 23, 24 of the ring groove of the piston.

In the combined oil control ring, a lubricant which is scraped by the slide surfaces 8, 9 of the rails is allowed to move into an inner peripheral side of the oil ring body 1 from an outer peripheral groove 14 defined by the upper and lower rails 3, 4 and the web 5 through a large number of windows 25 formed in the web 5. The lubricant which is moved into an inner peripheral side of the oil ring groove 21 through the windows 25 is returned to an oil pan through an oil hole formed in the piston 20.

As shown in FIG. 4, inner peripheral surfaces 18, 19 of inner-peripheral protruding portions 15, 16 of the upper and lower rails 3, 4 have an arcuate shape and an inner peripheral groove 17 is formed of the inner-peripheral protruding portions 15, 16 and the web 5. The coil expander 2 is housed in the inner peripheral groove 17. By bringing the coil expander 2 and the arcuate surfaces 18, 19 of the inner peripheral groove 17 of the oil ring body 1 into contact with each other, the oil ring body 1 is pushed toward the cylinder wall 22.

The shape of the inner-peripheral protruding portions 15, 16 of the upper and lower rails 3, 4 may have a cross section of an approximately trapezoidal shape. In this case, as shown in FIG. 5, the inner peripheral groove 17 is formed of the inner-peripheral protruding portions 15, 16 and the web 5. The coil expander 2 is housed in the inner peripheral groove 17. By bringing the coil expander 2 and tapered surfaces 18, 19 of the inner peripheral groove 17 formed in the oil ring body 1 into contact with each other, the oil ring body 1 is pushed toward to the cylinder wall 22.

Here, as can be easily understood from FIG. 4 and FIG. 5, a maximum distance L2 in the axial direction between the inner-peripheral-groove arcuate surfaces 18, 19 or the inner-peripheral-groove tapered surfaces 18, 19 (see FIG. 5) of the oil ring body 1 is determined by a axial distance between inner peripheries 27', 28' of the inner peripheral groove 17.

As shown in FIG. 4, when the combined oil control ring, which the coil expander 2 is housed in the oil ring body 1, is mounted in the oil ring groove 21 of the piston 20, an opening between butt ends of the oil ring body 1 is widened until an inner diameter of the combined oil control ring becomes larger than a piston diameter. However, when the opening between the but ends of the oil ring body 1 is widened, it is likely to occur that the coil expander 2 falls off the inner periphery groove of the oil ring body 1. When the coil expander 2 falls off the inner periphery groove of the oil ring body 1, it is necessary to restart the assembling operation of the coil expander 2 and the oil ring body 1 from the beginning.

Recently, in addition to enhance the conformability to the cylinder wall, the wear resistance and the scuff resistance of the combined oil control ring, a demand for lowering tension of the coil expander is increasing. By lowering the tension of the coil expander, it is possible to obtain the excellent oil ring characteristics. On the other hand, the drawback that the coil expander falls off the oil ring body during assembling of the oil control ring to the piston becomes apparent. However, with respect to the combined oil control ring, no countermeasures have been taken to prevent the coil expander from falling off heretofore.

SUMMARY OF THE INVENTION

The present invention has been made in view of the above-mentioned circumstances and it is an object of the present invention to provide a combined oil control ring which can prevent a coil expander from falling off an oil ring body at the time of mounting the combined oil control ring on the piston without losing functions of the oil ring such as oil scraping.

To achieve the above-mentioned object, the present invention provides a combined oil control ring which consists of an oil ring body which is formed of upper and lower rails which bring outer peripheral surfaces thereof into slide contact with an inner surface of a cylinder and a web 5 which connects the upper and lower rails and includes a plurality of windows, and a coil expander which pushes the oil ring body in the direction toward the inner surface of the cylinder, the coil expander being housed in an inner-peripheral groove of the oil ring body, wherein projecting portions which extend toward a center line in the thickness direction are formed at inner peripheral sides in the radial direction than a position where an axial distance between inner peripheries of an inner-peripheral groove portion of the oil ring body becomes maximum. Due to such a construction, when the oil control ring is mounted on the piston by widening an opening between but ends of the oil ringbody, it is possible to prevent the coil expander housed in from falling off the oil ring body.

Further, at the time of mounting the combined oil control ring on the piston, it is possible to prevent the coil expander from falling off by setting an axial distance between the inner peripheries of the inner-peripheral groove portion of the oil ring body smaller than the maximum distance L2, in the inner portion than the position of L2.

It is preferable that L1 and L2 satisfy a relationship of $0.03 \leq (L2-L1)/L1 \leq 0.15$. Here L1 means the minimum distance and L2 means the maximum distance. It is more desirable that L1 and L2 satisfy a relationship of $0.05 \leq (L2-L1)/L1 \leq 0.10$. When $(L2-L1)/L1$ is smaller than 0.03, the remarkable falling-off prevention effect of coil expander cannot be recognized, while when $(L2-L1)/L1$ exceeds 0.15, it becomes difficult to insert the coil expander into the oil ring body.

Further, according to the present invention, it is preferable that a coil diameter d of the coil expander and L1 of the oil ring body satisfy a relationship of $0.2 \text{ mm} \geq L1-d \geq -0.10 \text{ mm}$. So long as this relationship is satisfied, there is no possibility that the oil ring body leaves the deformation strain due to a force which is applied at the time of opening the inner peripheral ends of the oil ring in the axial direction in housing the coil expander in the oil ring body. Further, when an opening between the but ends of the oil ring body is widened in the peripheral direction at the time of mounting the oil ring on the piston, the coil expander hardly falls off the oil ring body.

DESCRIPTION OF THE PREFERRED EMBODIMENTS

Figure 1:
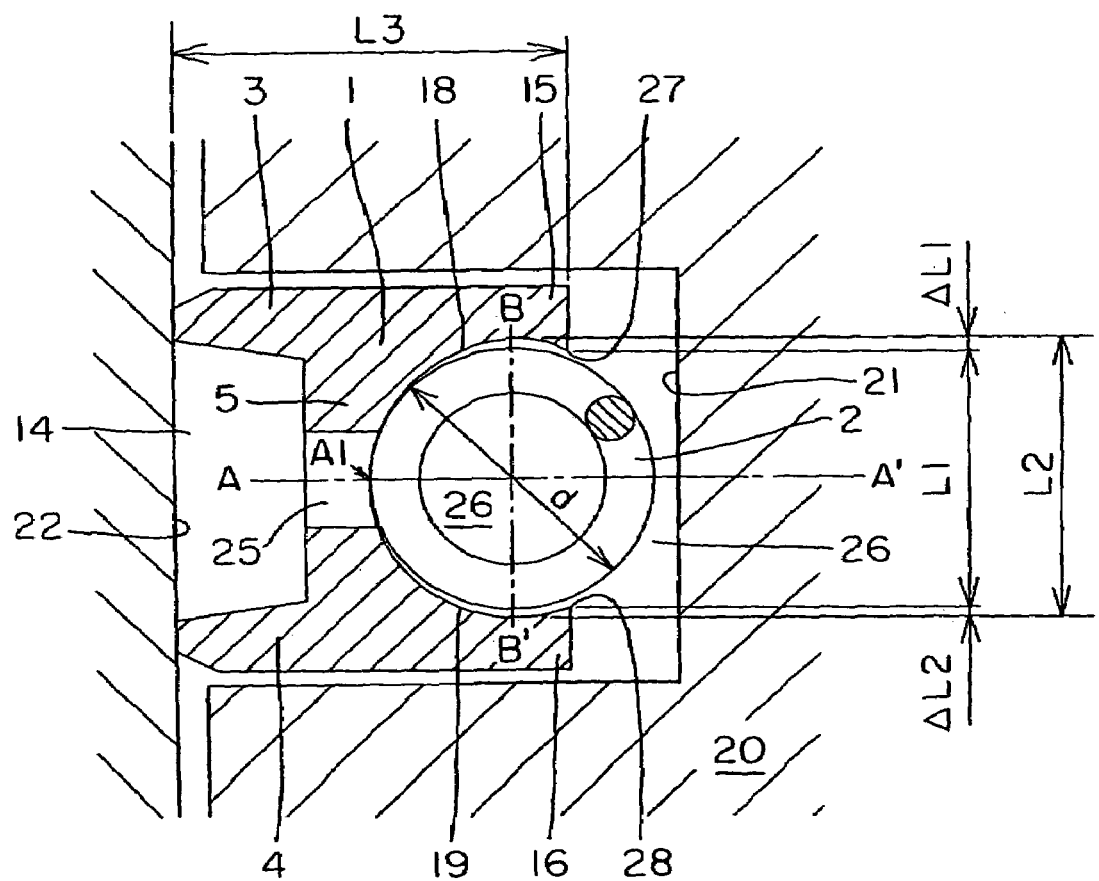
FIG. 1 is a cross-sectional view in the radial direction of a combined oil control ring showing one embodiment of the present invention.
Figure 2:
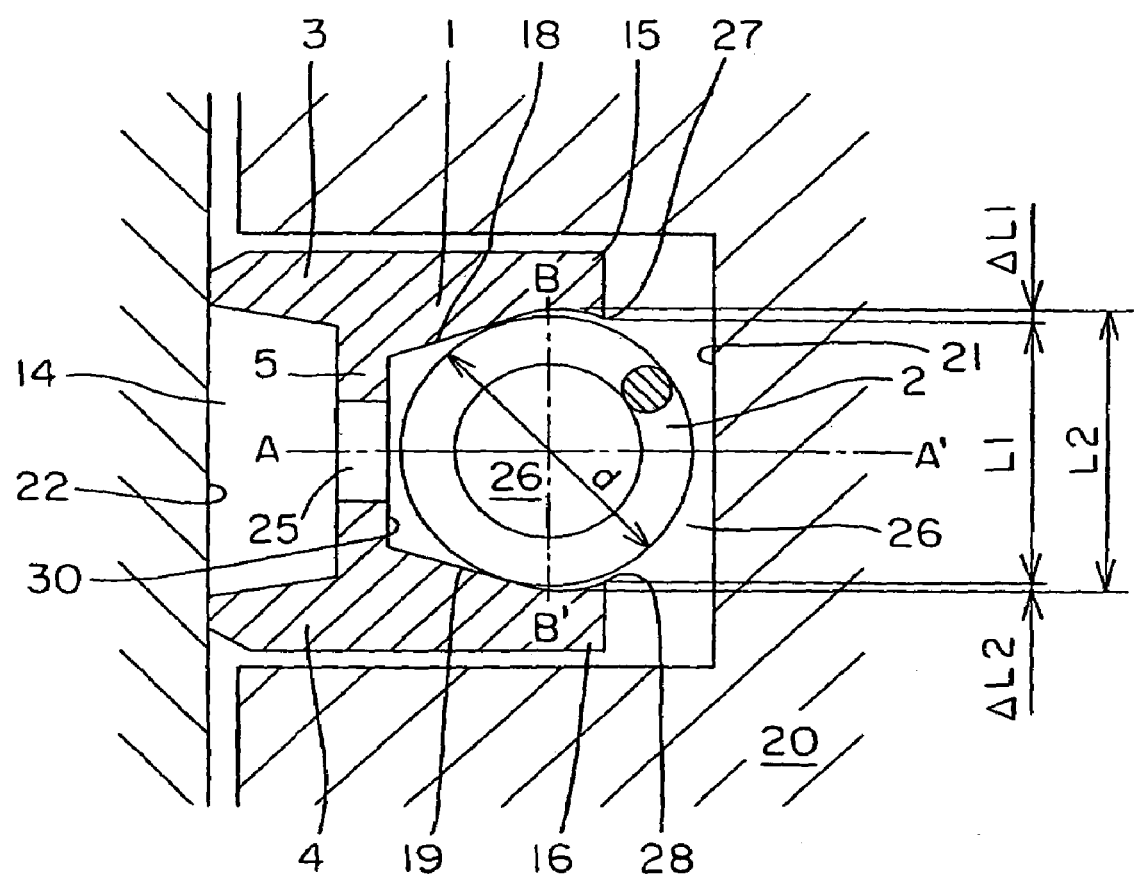
FIG. 2 is a cross-sectional view in the radial direction of a combined oil control ring showing another embodiment of the present invention.
Figure 3:
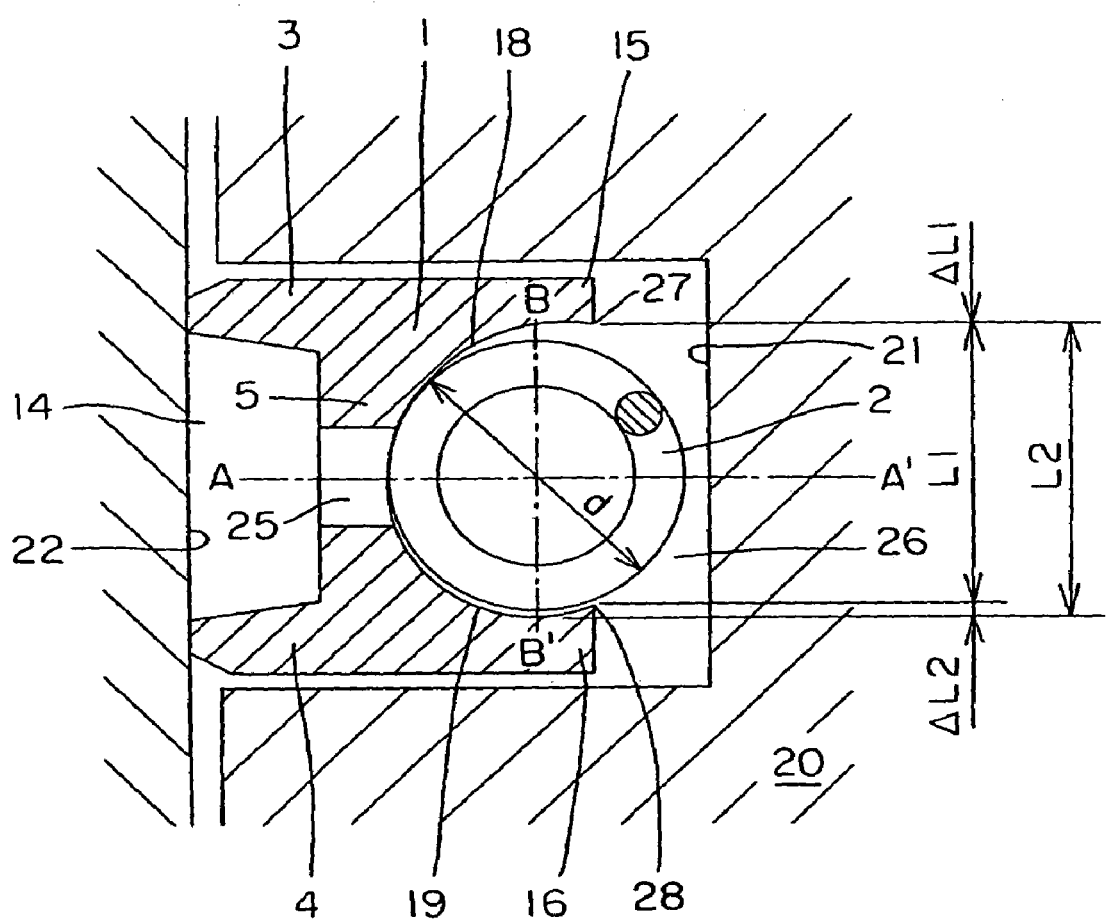
FIG. 3 is a cross-sectional view in the radial direction of a combined oil control ring showing another embodiment of the present invention.
Figure 4:
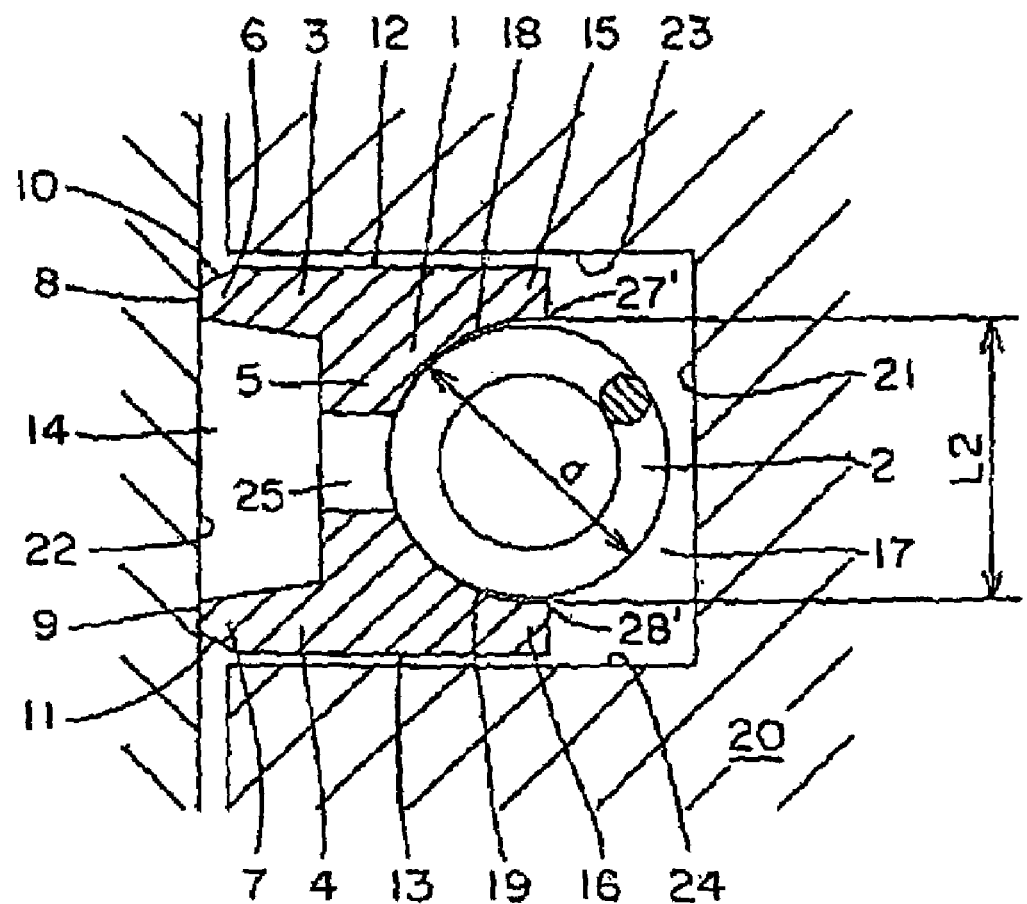
FIG. 4 is a cross-sectional view in the radial direction of an example of a conventional combined oil control ring.
Figure 5:
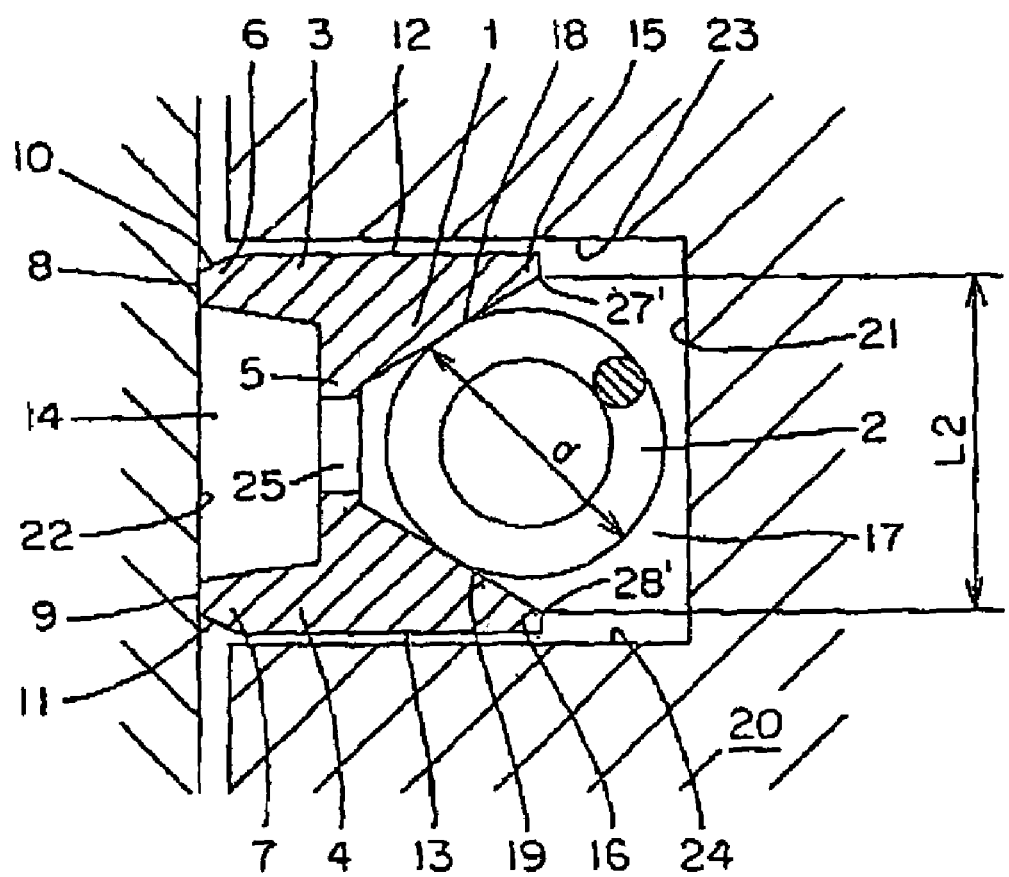
FIG. 5 is a cross-sectional view in the radial direction of another example of the conventional combined oil control ring.

Preferred embodiments of the present invention are described in detail in conjunction with FIG. 1 to FIG. 3. With respect to constructions of these embodiments, the explanation of portions which are common with the portions of the prior art shown in FIG. 4 and FIG. 5 is omitted. Here, to some among the portions common with the portions shown in FIG. 4 and FIG. 5, the reference numerals used in FIG. 4 and FIG. 5 are given.

In the embodiment shown in FIG. 1, a thickness of the oil ring body 1 is set as L3 and the inner peripheral portions 18, 19 of the inner-peripheral protruding portions 15, 16 of the upper and lower rails 3, 4 have an arcuate shape thus forming an inner-peripheral groove portion 26 which houses the coil expander 2. With respect to the inner-peripheral groove portion 26, a width (distance) thereof in the axial direction expands while drawing arcs toward the radially inward direction in a vertical symmetry (an upper and lower symmetry) from a crossing point A1 of the inner-peripheral groove portion 26 and a thickness-direction center line (a line which passes the center of the width of the oil ring body 1) AA' and assumes a maximum value L2 at a line BB'. Projecting portions 27, 28 which extend toward the thickness-direction center line AA' are formed at positions disposed more inside in the radial direction than the line BB'. Due to the provision of these projecting portions 27, 28, it is possible to prevent the coil expander 2 from falling off at the time of mounting the combined oil control ring on the piston 20.

In FIG. 1, the projecting portions 27, 28 are formed on open peripheries of the inner-peripheral groove portion 26 and a distance between the open peripheries in the axial direction assumes a minimum value L1 in inner position in the radial direction than the line BB'. However, provided that the projecting portion is formed in inner position than the line BB', the position where the projecting portions are formed and define the minimum value L1 is not limited to the open peripheries.

Assume the distance in the axial direction between B, an upper end of the maximum axial distance L2 and a lower end of the upper projecting portion 27 as $\Delta L1$, and the distance in the axial direction between B', a lower end of the maximum axial distance L2 and an upper end of the lower projecting portion 28 as $\Delta L2$. In the construction shown in FIG. 1, the projecting portions 27, 28 are formed in a vertical symmetry in the inner-peripheral groove portion 26 of the oil ring body 1 and $\Delta L1$ and $\Delta L2$ are set equal.

Further, in the embodiment shown in the drawing, although the projecting portions 27, 28 have an approximately triangular cross section, the shape of the projecting portions 27, 28 is not specifically limited. Further, although the peripheral ends of the projecting portions 27, 28 form an acute angle or are pointed, flattened portions may be formed on the ends of the projecting portions 27, 28 or the ends of the projecting portions 27, 28 may be rounded in view of manufacturing reasons and the prevention of fracture.

Although the projecting portions 27, 28 maybe formed on the whole periphery of the oil ring body 1, it is possible to prevent the coil expander from falling off even when the projecting portions 27, 28 are formed partially on the oil ring body in a circumferential direction. However, when the projecting portions 27, 28 are formed partially, it is necessary to take proper measures to suppress the occurrence of non-uniform face pressure of the oil ring.

In an embodiment shown in FIG. 2, the inner-peripheral groove portion 26 is formed of upper and lower inclined surfaces 18, 19 and a vertical surface 30 which connects these inclined surfaces 18, 19. Further, both of the upper and lower groove portions form arcuate surfaces from a position slightly outside the line BB' along which the width of the inner-peripheral groove portion 26 assumes the maximum in the axial direction. Further, both of the upper and lower groove portions also form arcuate surfaces inside the line BB' independently from the arcuate surfaces outside the line BB'. In the same manner as the embodiment shown in FIG. 1, the projecting portions 27, 28 having a cross section of an approximately triangular shape are formed on open peripheries. The oil ring body 1 having such a construction is also provided with the projecting portions 27, 28 and the position which sets the minimum size L1 in the axial direction of the inner-peripheral groove portion 26 is not always set at the open peripheries.

Further, it is not always necessary to form the arcuate surfaces formed in FIG. 2 and the inner-peripheral groove portion 26 may adopt the configuration in which the projecting portions 27, 28 maybe directly formed next to inclined surfaces 18, 19. However, to prevent the coil expander from falling off without causing any troubles in operation at the time of mounting the coil expander 2, it is preferable that the projecting portions 27, 28 are formed more gently and hence, it is desirable to form the arcuate surfaces as shown in FIG. 2.

The construction shown in FIG. 3 is substantially equal to that of the embodiment shown in FIG. 1 except for a point that the projecting portion 28 is formed only on the lower portion and is not formed on the upper portion of the inner-peripheral groove portion 26. The coil expander 2 usually falls off downwardly and hence, the construction which forms the projecting portion 28 only on the lower portion of the inner-peripheral groove portion 26 also can prevent the coil expander from falling off. Here, although the projecting portion is formed only on the lower portion of the peripheral groove portion 26 in the drawing, with respect to the oil ring body 1 served in an actual operation, usually, there is no distinction between the upper portion and the lower portion and hence, the oil ring body 1 is mounted in a posture that a side of the oil ring body 1 where the projecting portion is formed is set as a lower side.

Further, even when the projecting portions are formed on both sides of the oil ring body 1, ΔL1 and ΔL2 are not always required to have the same distance and the relationship between them may be set to ΔL1>ΔL2 or ΔL1<ΔL2. As mentioned previously, usually, the coil expander 2 falls off toward the lower side and hence, when the maximum value L2 is fixed, the lower projecting portion 28 is formed larger than the upper projecting portion 27. That is, by setting the relationship between them to ΔL1<ΔL2, it can be effectively achieved to prevent the coil expander 2 from falling off. Here, "upper" and "lower" correspond to "upper" and "lower" at the time of mounting the combined oil control ring.

By extending the radial thickness of the oil ring body 1 toward the inward direction thus increasing the radial thickness of the inner-peripheral protruding portions 15, 16, it is possible to prevent the coil expander from falling off. Although not shown in the drawing, by extending the radial thickness and by forming the projecting portions in the inner peripheral groove, the falling-off prevention effect of the coil expander can be further enhanced. However, when the radial thickness of the inner-peripheral protruding portions 15, 16 is increased, there exists a tendency that the conformability of the oil ring to the cylinder wall is lowered and hence, it is necessary to determine the optimum radial thickness, that is, the optimum thickness of the oil ring in view of both of these characteristics.

EXAMPLES 1 TO 6

A martensitic stainless steel wire having a cross section of oil ring body shown in FIG. 1 is wound around to define a bore diameter thus producing the oil ring body shown in FIG. 1. Here, a tension Ft of the oil ring is set to 10 N, a nominal diameter is set to 75.0 mm, a radial thickness of the ring body is set to 1.5 mm, and an axial width of the ring body is set to 1.5 mm. While setting L2 at the largest portion of the inner peripheral groove space to L2=1.092 mm (BB'), the oil ring bodies which form the projecting portions 27, 28 in a vertical symmetry are manufactured such that inner peripheral groove space has the minimum distances L1 shown in Table 1 at the open peripheries.

COMPARISON EXAMPLE

The oil rings shown in FIG. 4 are manufactured in the same manner as the example 1. A tension of the oil ring, a nominal diameter, a radial directional thickness and an axial width of the ring body are set to the same values as the example 1. In this specification, the projecting portions are not formed and hence, the axial width at the open peripheries 27, 28 is 1.092 mm and corresponds to the largest width L2 (L1=L2) in the inner peripheral groove space. This conventional ring is used as a comparison example.

[Mounting Confirmation Test]

Coil expanders having a coil diameter d of 1.060 mm are inserted into the oil ring body of the comparison example and the respective oil ring bodies of the examples 1 to 6. The mounting confirmation test is performed on whether or not the coil expander falls off the oil ring body in mounting the combined two-piece oil control ring on the piston. After assembling the oil ring body and the coil expander, using a abut ends widening jig, an opening between but ends of the oil ring body is widened to 16.5 mm which is 11 times as large as 1.5 mm which is the radial thickness of the oil ring body and, then, the oil ring is mounted in the oil ring groove of piston. It is judged whether the oil ring can be mounted in the oil ring groove of the piston while preventing the coil expander from falling off the oil ring body at the time of widening the opening between but ends of the oil ring body. The test is carried out on 100 pieces of oil ring bodies with respect to each ring specification and the number of the oil rings which the coil expander falls off is counted. The result of the test is shown in Table 1.

Compared to the comparison example in which the projecting portions are not formed, in the examples in which the projecting portions are formed, the number of the oil rings which the coil expander falls off is decreased. By forming the projecting portions such that a ratio of (L2−L1)/L1 assumes 0.03 or more, the remarkable falling-off prevention effect of the coil expander is observed. On the other hand, when the ratio of (L2−L1)/L1 exceeds 0.15, it is difficult to insert the coil expander into the oil ring body.

TABLE 1

|  | L1 | L2−L1 | (L2−L1)/L1 | Number of coil expander fallen off |
|---|---|---|---|---|
| example 1 | 1.070 | 0.022 | 0.02 | 6 |
| example 2 | 1.060 | 0.033 | 0.03 | 1 |
| example 3 | 1.038 | 0.054 | 0.05 | 0 |
| example 4 | 0.989 | 0.103 | 0.10 | 0 |
| example 5 | 0.950 | 0.142 | 0.15 | 0 |
| example 6 | 0.933 | 0.159 | 0.17 | — |
| comparison example | 1.092 | 0 | 0 | 10 |

EXAMPLE 7

In the same manner as the example 1, the oil ring bodies in which a tension Ft of the oil ring is set to 10N, a nominal diameter is set to 75.0 mm, a radial thickness of the ring body is set to 1.5 mm, and an axial width of the ring body is set to 1.5 mm are produced. However, in this example, L2 at the largest portion of the inner peripheral groove space is set as L2=1.09 mm and L1 at the open peripheries is set to L1=1.01 mm. Further, the widths of the upper and lower projecting portions are made different from each other such that ΔL1 assumes 0.028 mm and ΔL2 assumes 0.052 mm.

After combining the coil expander having a coil diameter d of 1.060 mm with the obtained oil ring body, the mounting confirmation test is performed in the same manner as the example 1 such that ΔL2 is disposed at the lower side. As a result, in 100 combined oil control rings tested, no falling off of the coil expander is recognized.

EXAMPLE 8

In the same manner as the example 1, the oil ring bodies shown in FIG. 3 are produced. Here, however, L2 at the largest portion of the inner peripheral groove space is set as L2=1.12 mm and L1 at the open peripheries is set to L1=1.067 mm. Further, no projecting portion is formed on the upper portion of the oil ring body so that ΔL1 assumes 0 mm and the projecting portion is formed only on the lower portion of the oil ring body, wherein ΔL2 assumes 0.028 mm. By combining the coil expander having a coil diameter d of 1.060 mm with the obtained oil ring body, the mounting confirmation test is performed in the same manner as the example 1 in a state that the portion where the projecting portion is formed is set as a lower side. As a result, the number of coil expander fallen off is two in 100 combined oil control rings tested.

EXAMPLES 9 TO 15

In the same manner as the example 1, the oil ring bodies in which a tension Ft of the oil ring is set to 10N, a nominal diameter is set to 75.0 mm, a radial thickness of the ring body is set to 1.5 mm, an axial width of the ring body is set to 1.5 mm, and L1 takes values shown in Table 2 at the opening peripheries are produced. In these oil ring bodies, the projecting portions 27, 28 are formed in a vertical symmetry. By combining the coil expander having a coil diameter d of 1.055 mm with the obtained oil ring body, the mounting confirmation test is performed in the same manner as the example 1. The obtained result is shown in Table 2. When a value of L1−d is decreased to approximately 0.3 mm, the remarkable falling-off prevention effect of the coil expander is recognized. Although the falling-off prevention effect of the coil expander is further enhanced by further decreasing the value of L1, when the value of L1−d assumes −0.20, it is impossible to insert the coil expander into the oil ring body without causing the plastic deformation.

TABLE 2

| | L1 | L1−d | Number of coil expander fallen off |
|---|---|---|---|
| example 9 | 0.85 | −0.205 | — |
| example 10 | 0.95 | −0.105 | 0 |
| example 11 | 1.05 | −0.005 | 0 |
| example 12 | 1.15 | 0.095 | 1 |
| example 13 | 1.25 | 0.195 | 2 |
| example 14 | 1.35 | 0.295 | 2 |
| example 15 | 1.45 | 0.395 | 6 |

EXAMPLE 16

The oil ring bodies shown in FIG. 1 are produced in the same manner as the example 1. Here, however, the ends of the open peripheries are extended only in the radially inward direction and the thickness in the radial direction is set to 1.575 mm which is 5% thicker than L3 (1.5 mm) and, further, projecting portions are formed on the open peripheries in a vertical symmetry thus producing the oil ring body having L1 of 1.062 mm. Further, as a comparison example, the oil ring body which has the radially extended thickness of 1.575 mm and has no projecting portions is produced (comparison example 2). The coil expander having a coil diameter d of 1.060 mm is combined with the respective obtained oil ring bodies. The mounting confirmation test is performed in the same manner as the example 1. As a result, with respect to the comparison example 2, the number of coil expander fallen off is 7 in 100 combined oil control rings tested, while with respect to the example 16, falling-off of the coil expander is not recognized.

The explanation has been made with respect to a case in which the inner peripheral surfaces 18, 19 of the oil ring body which are portions brought into contact with the coil expander 2 have an arcuate shape. However, the substantially same advantageous effect can be obtained even when the inner peripheral surfaces 18, 19 of the oil ring body which construct coil-expander contact portions have a tapered shape (see FIG. 2).

According to the present invention, in mounting the oil ring on the piston by widening the opening between the but ends of the oil ring body of the combined oil control ring, it is possible to prevent the coil expander from falling off the oil ring body and hence, the combined oil control ring which enables the extremely easy assembly can be realized.

What is claimed is:

1. A combined oil control ring consisting of:
an oil ring body which is integrally formed of upper and lower rails which bring outer peripheral surfaces thereof into slide contact with an inner surface of a cylinder and a web which connects said upper and lower rails and includes a plurality of windows, and
a coil expander which pushes said oil ring body in the direction toward said inner surface of said cylinder, said coil expander being housed in an inner-peripheral groove portion of said oil ring body,
wherein projecting portions which extend toward a center line in the thickness direction are formed at inner peripheral sides in the radial direction than a position where an axial distance between inner peripheries of said inner-peripheral groove portion of said oil ring body becomes maximum,
wherein the axial distance between inner-peripheries of said inner-peripheral groove portion of the oil ring body is smaller than a maximum distance L2, in an inner portion than the position of L2,
and wherein a minimum distance L1 and the maximum distance L2 satisfy a relationship of $0.03 \leq (L2-L1)/L1 \leq 0.15$, said minimum distance L1 being said axial distance between inner-peripheries of the inner-peripheral groove portion of said oil ring body.

2. The combined oil control ring according to claim 1, wherein a cross-sectional shape in the radial direction of said inner-peripheral groove portion of said oil ring body is formed of an arcuate surface.

3. The combined oil control ring according to claim 1, wherein a cross-sectional shape in the radial direction of said inner-peripheral groove portion of said oil ring body includes a pair of inclined surfaces which face each other and a vertical surface in the axial direction which connects both inclined surfaces.

4. The combined oil control ring according to claim 1, wherein the projecting portion is formed on only one periphery of said inner-peripheral groove portion of said oil ring body.

5. The combined oil control ring according to claim 1, wherein the maximum widths in the axial direction of the projecting portions formed on upper and lower portions of said inner-peripheral groove portion of said oil ring body differ from each other.

6. The combined oil control ring according to claim 1, wherein the minimum distance L1 and an outer diameter d of said coil expander have a relationship of $0.2 \text{ mm} \geq L1-d \geq -0.10 \text{ mm}$.

7. The combined oil control ring according to claim 1, wherein the projection portions are partially formed on said oil ring body in a circumferential direction.

* * * * *